Oct. 25, 1966 C. J. DE GRAVE, JR., ET AL 3,280,857
SAMPLE HOLDER
Filed May 14, 1964
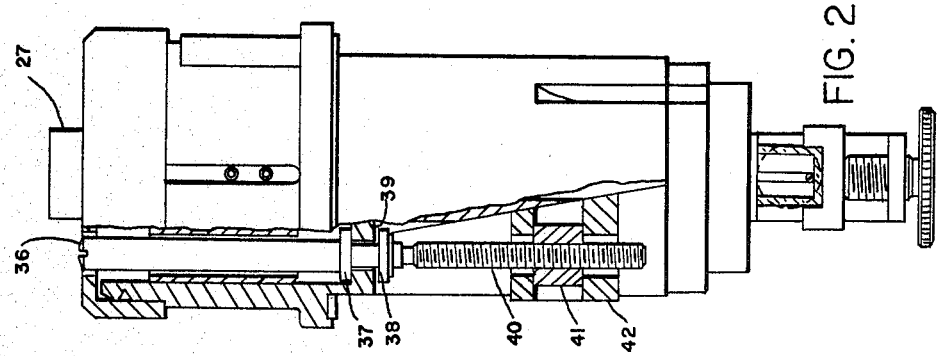
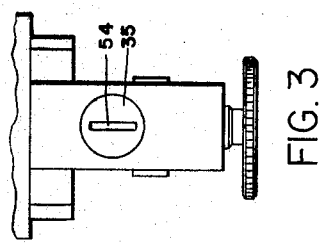
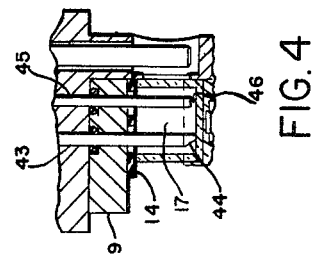
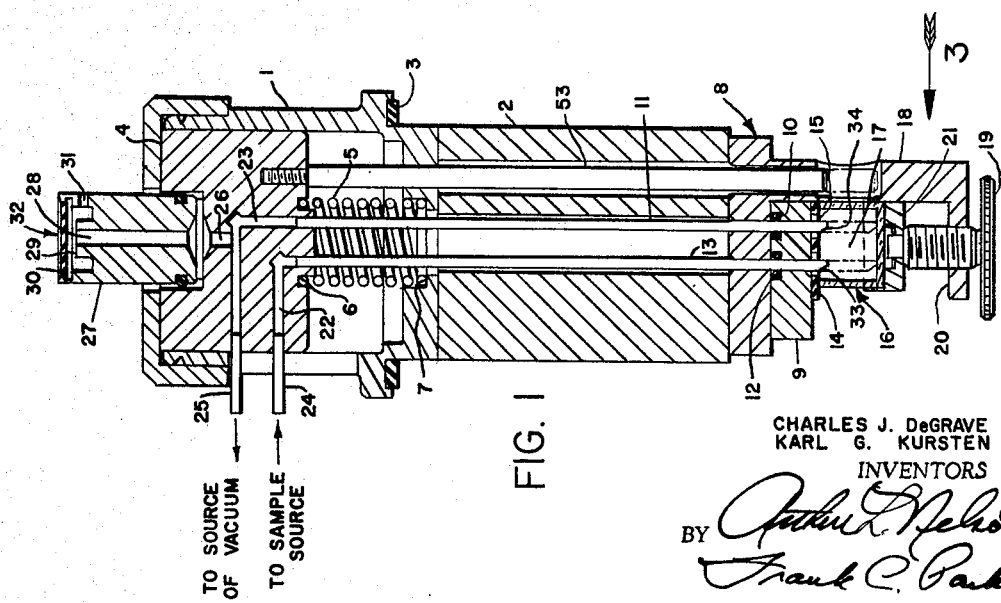
CHARLES J. DeGRAVE JR.
KARL G. KURSTEN
INVENTORS
ATTORNEYS

United States Patent Office 3,280,857
Patented Oct. 25, 1966

3,280,857
SAMPLE HOLDER
Charles J. De Grave, Jr., Chili, and Karl G. Kursten, Irondequoit, N.Y., assignors to Bausch & Lomb Incorporated, Rochester, N.Y., a corporation of New York
Filed May 14, 1964, Ser. No. 367,499
6 Claims. (Cl. 141—21)

This invention relates to spectrophotometry and more particularly to a means of handling fluid samples in a spectrophotometer.

The analysis of fluid samples in spectrophotometry and colorimetry is accomplished by placing of a sample in the optical path to determine the characteristics of the fluid. The use of a plurality of cuvettes which are manually positioned in the optical path for examination and then removed is burdensome. This requires considerable handling, cleaning, and storage of the sample cuvettes prior and subsequent to viewing in the optical path.

Accordingly, this invention is intended to provide a rapid convenient means of positioning a sample in an optical path and then removing the sample subsequent to viewing.

It is an object of this invention to provide a vacuum feed and discharge of a fluid sample in a sample chamber of a flow-through cuvette.

It is another object of this invention to provide conduit means with a sample chamber and valve means intermediate the inlet and the outlet for controlling the movement of the sample.

It is a further object of this invention to provide a sealed sample chamber which may be filled and emptied by a controlled vacuum applied to the outlet tube.

The objects of this invention are accomplished by providing means for supporting a cuvette forming a sample chamber. The sample chamber is sealed by the supporting structure and an inlet tube connected to the sample source extends into the sample chamber. An outlet tube extending from the sample chamber through a valve is connected to a source of vacuum. The inlet and outlet tubes are formed integral with a piston and reciprocate into and out of the sample chamber in response to manual control. Simultaneous with depressing the tubes into the sample chamber a valve in the outlet conduit means controls the vacuum in the chamber to evacuate a sample from the chamber and to draw a new sample into the chamber. The device is designed for reception within a spectrophotometer and positioning of the sample in an optical path for an analysis through spectrophotometry.

The preferred embodiments of this invention will be described in the following paragraphs and illustrated in the attached drawings.

FIG. 1 illustrates a cross section view of the cuvette assembly.

FIG. 2 is a fragmentary cross section view taken at right angles to FIG. 1 with the cuvette broken away.

FIG. 3 is a fragmentary side elevation view taken in the direction of arrow 3.

FIG. 4 is a modification of the cuvette and sample chamber taken as viewed in FIG. 1.

Referring to the drawings FIG. 1 illustrates a cross section of the cuvette assembly. The cylinder 1 is fastened to the block 2. The seal ring 3 is adapted for engaging a mounting element in a spectrophotometer not shown. The cylinder 1 receives the piston 4 which reciprocates within the cylinder 1. The piston 4 is biased to an upward position as indicated by the spring 5 which mounts in an annular recess 6 in the piston 4 and seats with its opposite end on the radial flange 7.

The block 2 has a plate 8 fastened to its lower surface. The retainer 9 is connected to the plate 8 and retains the O-ring 10 for the outlet tube 11 and the O-ring 12 for the inlet tube 13. The inlet tube 13 and the outlet tube 11 extend through openings in the cylinder 1, the block 2, the plate 8, and the retainer 9. A seal 14 is fitted on the lower surface of the retainer 9 which engages the upper surface 15 of the cuvette 16. The seal 14 maintains a vacuum within the sample chamber 17 when a vacuum is applied by the outlet tube 11. A bracket 18 extends downwardly from the plate 8 and receives a thumb screw 19 which threadedly engages the horizontal flange 20. The upper end of the thumb screw 19 receives the platform 21 which supports the cuvette 16. The thumb screw 19 may be rotated upwardly to seat the cuvette 16 and provide a sealed chamber 17 when in position as shown. The thumb screw 19 may be counter-rotated to lower the platform 21 for removal of the cuvette 16. Extensions of the inlet tube 13 and the outlet tube 11 communicate through passages 22 and 23 to the inlet extension tube 24 and outlet extension tube 25 respectively. The inlet extension tube 24 is adapted for connection to a sample source. The sample source may be changed at will of the operator or the same source may be used continuously. The outlet tube extension 25 is adapted for continuous connection to a source of vacuum.

A vertical opening 26 extends into the sleeve 27 which forms a hole 28 forming a valve seat 29 on its upper end. The valve seat 29 is shown on the upper central surface of the sleeve 27. The diaphragm 30 forms a valve element which when depressed closes the hole 28 and prevents the vent 31 from drawing air from the atmosphere. When the valve element 30 is in a position as shown the source of vacuum applied to the outlet tube extension 25 draws air through the vent 31 and a minimum of vacuum is present in the sample chamber 17.

When the valve element 30 is forced downwardly the opening 28 is closed and a vacuum is created in the sample chamber 17 which causes an emptying of the sample chamber. Simultaneous with the closing of the valve 32 the sleeve 27 may be moved downwardly to a position where the lower ends of the inlet tube 13 and the outlet tube 11 engage the top surface of the bottom of the cuvette. A lateral passage is formed by the bevels 33 and 34 of the inlet tube 13 and the outlet tube 11 respectively.

The sleeve 27 is shown in the downward position in FIG. 2. The tubes in this position engage the inner surface of the bottom of the cuvette. Simultaneously with the lowering of the inlet tube 13 and the outlet tube 11 the shutter 53 is lowered in front of the slit opening 54 in the mask 35. This blocks light transmission through the optical system. The mask 35 is formed on the bracket 18 and limits the amount of light directed through the cuvette.

The cuvette assembly has a means for retention within a a spectrophotometer. This is provided by the screw 36 having the shoulders 37 and 38 which receive the radial flange 39 of the cylinder 1. The screw 36 is fixed in its verticle position and therefore the threaded portion 40 biases the nut 41 to lift the wedge 42 which engages the inner periphery of the hole in which the cuvette assembly is positioned. This provides for easy removal or locking of a cuvette in a spectrophotometer.

FIG. 4 illustrates a modification of the cuvette assembly together with the inlet and outlet tubes. The cuvette 17 is in the position whereby the retainer 9 is seated against the seal 14. The inlet tube 43 has a bevel surface 44 providing a lateral passage for admission of the fluid sample although the inlet tube 43 engages the bottom surface of the cuvette. The clearance 46 of the outlet tube 45 is controlled by the inlet tube 43 which are connected integrally with the piston 4. The clearance 46 may be accurately controlled in this manner and the amount of fluid withdrawn from the cuvette and the rate of fluid withdrawn may be regulated according to the clearance provided.

The operation of the cuvette assembly will be described in the following paragraphs. A source of vacuum is connected to the outlet tube extension 25. The inlet tube 13 and the outlet tube 11 extend into sample chamber 17 of the cuvette 16. When it is desired to evacuate the sample chamber the valve 32 is closed by pressing the valve element 30 against the valve seat 29 and closing communication from passage 23 through the vent 31 to atmosphere. Additional pressure on sleeve 27 will cause the tubes 13 and 11 to engage the bottom of the cuvette. A vacuum in the sample chamber 17 is created which evacuates the cuvette 16. Lateral passages are provided by the bevelled surfaces 33 and 34. In this position, the vacuum in the outlet tube 11 will cause a withdrawal of the sample from the chamber 17. When the sample is evacuated the valve 32 is released and the vacuum is reduced due to the fact that the vent 31 is again in communication with the passage 23.

When it is desired to fill the sample chamber 17 the valve element 30 is pressed against the valve seat 29 and the valve 32 is closed. The inlet tube extension 24 is connected to a sample source and the outlet tube extension 25 is connected to the source of vacuum. A continued vacuum condition will draw a new sample into the chamber 17. When the filling is complete the valve 32 is released and the piston 4 moves upwardly to the position as shown with the valve 32 open. This removes the vacuum within the chamber 17. With the sample chamber filled the cuvette assembly is ready for viewing of the sample. This cycle may be repeated as often and as rapidly as necessary.

If a rinsing of the sample chamber is desired this is easily accomplished through the same operation as filling.

The preferred embodiment of this invention has been illustrated and described and it is understood that other embodiments may be devised which would fall within the scope of the claims which define this invention.

We claim:
1. A cuvette holder comprising, a cuvette defining a sample chamber, means supporting said cuvette, an inlet tube adapted for connection to a sample source and an outlet tube adapted for connection to a source of vacuum extending above said sample chamber, means for moving said inlet tube and said outlet tube to a position adjacent to the bottom of said cuvette and a position at the top of said cuvette, valve means including a vent coupled to said outlet tube for selectively venting said outlet tube to the atmosphere and for closing said vent for causing the source of vacuum to withdraw a sample from said cuvette when said tubes are positioned adjacent the bottom of said cuvette and fill said cuvette with a subsequent sample when said tubes are positioned above said sample chamber.

2. A cuvette assembly comprising in combination, means defining a sample chamber, an inlet tube adapted for connection to a sample source and extending into said sample chamber, a lateral passage means at the lower end of said tube adapted to engage the bottom of said cuvette, an outlet tube adapted for connection to a source of vacuum and extending into said sample chamber, means reciprocably supporting said inlet tube and said outlet tube and supporting the lower end of said inlet tube below the lower end of said outlet tube for movement in said cuvette to permit passage of fluid intermediate the upper bottom surface of said cuvette and the lower end surface of the outlet tube, a vent coupling said outlet tube to atmosphere, a valve means in said outlet tube operable to close said vent and means for sequentially controlling the operation said valve means and the movement of said inlet tube to engage the upper bottom surface of said cuvette forming said chamber and thereby providing for the evacuation of said sample chamber through said outlet tube and refilling of said chamber by a sample from said inlet tube.

3. A cuvette holder comprising a cuvette defining a sample chamber, means supporting said cuvette, an inlet tube adapted for connection to a sample source and an outlet tube adapted for connection to a source of vacuum, means movably supporting said inlet tube and said outlet tube for positioning the lower ends of said tubes at an up position near the top of said sample chamber and a down position adjacent to the bottom of said sample chamber, valve means including a vent for venting said outlet tube to atmosphere and closing said vent to cause the source of vacuum to withdraw a sample from said cuvette when said tubes are in said down position and refill said cuvette with subsequent sample when said tubes are in said up position.

4. A cuvette assembly comprising a cuvette defining a sample chamber, means for supporting said cuvette, an inlet tube adapted to be connected to a fluid sample source, an outlet tube adapted to be connected to a source of vacuum, means for movably mounting said inlet tube and said outlet tube for movement into said cuvette to a first position adjacent the bottom of said cuvette and for movement away from the bottom of said cuvette to a second position, valve means including a vent coupling said outlet tube to said atmosphere, and means coupling said valve means to said movable mounting means so that in response to a force applied thereto said vent is closed and said oulet and inlet tubes cooperate to apply a fluid sample to said sample chamber and in response to a greater force said tubes are positioned adjacent said bottom portion and cooperate to remove a fluid from sample chamber.

5. A cuvette assembly comprising, a cuvette defining a sample chamber, means for supporting said cuvette, an inlet tube adapted to be connected to a source of fluid sample, an outlet tube adapted to be connected to a vacuum source, mounting means for movably mounting said inlet and outlet tubes for moving said tubes from a first position for delivery of a fluid into said sample chamber to a second position for removal of a fluid in said chamber, means for biasing said inlet and outlet tubes in said first position, vent means coupling said outlet tube to said atmosphere, means for biasing said vent means in an open position, and means coupling said vent means to said movable mounting means so that in response to a force applied thereto said vent means is closed for rendering said tubes in condition for translating a fluid into said sample chamber and in response to a further force positioning said inlet and outlet tubes in said second position for rendering said tube in condition for removal of a fluid from said sample chamber.

6. A cuvette assembly for photometric apparatus comprising a transparent container defining a sample chamber for receiving liquid samples to be analyzed, an inlet tube adapted to be connected to a source of liquid samples, an outlet tube adapted to be connected to a vacuum source, means for mounting said container including a seal, means for movably mounting said inlet and outlet tube so that said tubes extend through said seal and are adapted to be moved from a first operative position for delivery of a liquid sample to said sample chamber to a second operative position for removing a liquid from said sample chamber, means biasing said inlet and outlet tubes in said first operative position, vent means coupling said outlet tube to the atmosphere adapted to be closed for conditioning said inlet and outlet tubes for translating a liquid, means coupling said vent to said movable mounting means so that in response to a force applied thereto said vent means is closed and in response to a larger force said tubes are moved into said second operative position thereby providing for the translation of a liquid sample into and out of said sample chamber, and shutter means coupled to said movable mounting means for blocking radiation transmission through said container when said tubes are in said second operative position.

References Cited by the Examiner

UNITED STATES PATENTS

| 2,654,523 | 10/1953 | Busby | 141—388 X |
| 2,711,101 | 11/1956 | Thompson | 141—59 X |

FOREIGN PATENTS

| 792,544 | 10/1935 | France. |
| 186,614 | 2/1923 | Great Britain. |

LAVERNE D. GEIGER, *Primary Examiner.*

H. BELL, *Assistant Examiner.*